A. J. Morse,
Hose Coupling,
Nº 70,456. Patented Nov. 5, 1867.
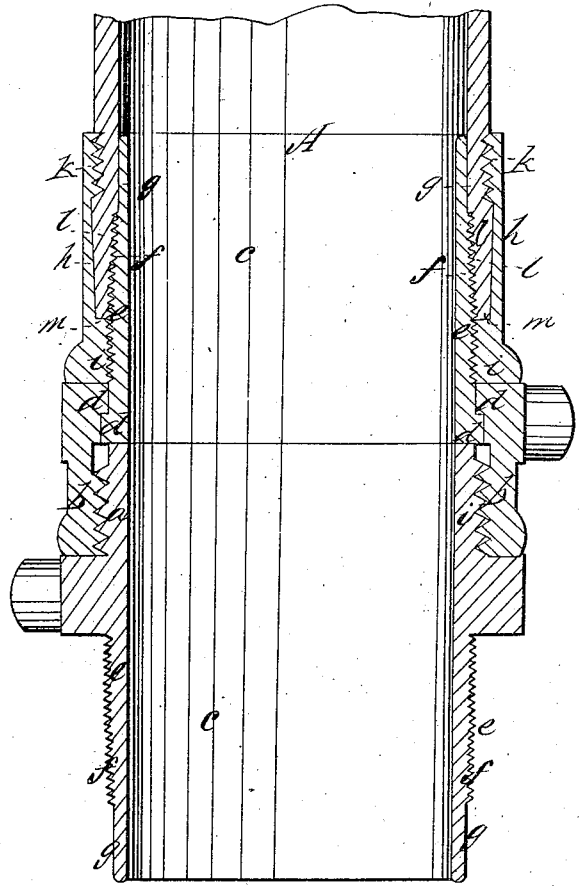
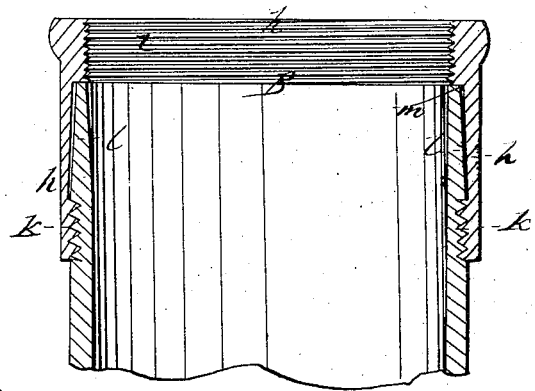
Witnesses: C. Warren Brown.
Inventor: A. J. Morse by Crosby Halsted & Gould Attys.

UNITED STATES PATENT OFFICE.

ANDREW J. MORSE, OF BOSTON, MASSACHUSETTS.

*Letters Patent No. 70,456, dated November 5, 1867.*

---

IMPROVEMENT IN HOSE-COUPLINGS.

---

*The Schedule referred to in these Letters Patent and making part of the same.*

---

TO ALL WHOM IT MAY CONCERN:

Be it known that I, ANDREW J. MORSE, of Boston, in the county of Suffolk, and State of Massachusetts, have invented an Improvement in Couplings for Hose, &c.; and I do hereby declare that the following, taken in connection with the drawings which accompany and form part of this specification, is a description of my invention sufficient to enable those skilled in the art to practise it.

In applying metal couplings to leather hose, the common practice is to construct each part of the coupling-screw with a tail or tube-piece, on the outer cylindric surface of which a screw-thread is cut, while over this tail-piece is a cylindric ring of corresponding length. This ring has a smooth inner surface, and in attaching the hose to the coupling the ring is first slid over the end of the hose, and the tail-piece is then entered into the hose and turned, the threads of the screw working into the inner surface of the leather until the tail-piece is brought home, or until the coupling-flange abuts against the end of the ring. The ring confines the leather, or the outer surface thereof, while the inner surface is compressed into the threads of the screw.

This method of attaching the hose, however, is found in practice to be defective or inefficient under the high pressure to which hydraulic hose is often subjected, and the couplings are blown off, and it is found necessary to rivet each coupling-ring to the hose to keep them together, three and sometimes six rivets having to be employed upon each ring for this purpose.

The object of my improvement is not only to save the labor and expense consequent upon the employment of these rivets, but to make a stronger and more perfect connection of the hose to the coupling-pieces than can be obtained by any of the means now in common use for effecting such attachment.

In my construction I cut a screw-thread upon the outer surface of each tail-piece, and a corresponding thread upon the inner end of the encompassing-ring, these connecting the ring and tail-piece together; and I also cut an inner or female screw-thread on the interior surface of the ring, at the outer end thereof, this screw being preferably a left-handed screw, and being intended to work over the outer surface of the hose.

In attaching the hose I first screw the ring, by means of the last-mentioned screw-thread, over the end of the hose, or upon the outer surface thereof, until the extreme end of the hose abuts against a shoulder near the inner end of the ring. The inner surface of the ring between the hose-screw and the connecting-screw is recessed or enlarged, and when the ring so applied to the end of the hose is screwed upon the tail-piece, the part of the hose adjacent to this recess is expanded into the same, and by reason of such expansion, and of the hold of the ring-screw upon the leather, no pressure which the hose itself will endure will be capable of bursting the hose away from the coupling. It is in this construction that my invention primarily consists.

The drawing represents a central section of the two parts of a metal hose-coupling embodying such invention.

The two parts or halves of the coupling are shown as screwed together, and to one part the hose is shown as attached, while at the other part the hose is shown as applied to the ring, the ring and hose being ready for connection with the tail-piece.

$a$ and $b$ denote the two parts of the coupling, connected by male and female screws in the ordinary manner. $c\,c$ are the two screw tail-pieces or tubes, one projecting directly from the coupling-piece $a$, and the other held to the opposite coupling-piece by flanges or lips $d$, as is well understood. On the outer surface of each tail-piece I cut a screw-thread, $e$, preferably making said screw straight at the inner end thereof, and tapering towards the outer end, as seen at $f$, while at or near the end of the tail-piece its outer surface is made smooth and straight, as seen at $g$. $h\,h$ denote the encompassing or hose-confining rings. Each has on its inner surface, at the inner end thereof, a female screw-thread, $i$, fitting upon the screw $e$ cut on the tail-piece, while at its outer end it has another female screw-thread, $k$, preferably a "left-handed" thread, the diameter of this screw $k$, or that end of the ring or tube $h$ at which it is cut, being greater than the diameter at the opposite end of the tube, as seen in the drawing. Between these screws the interior of the ring is enlarged, as seen at $l$, this enlargement or recess being preferably made tapering or conical.

The parts being so formed, the connection or attachment of the hose to the respective parts is accomplished as follows: The ring $h$, by means of its screw $k$, is first screwed over the outer surface of the hose until the end of the hose strikes the shoulder $m$ at the end of the connecting-screw $i$, as seen at B, or the ring may be nipped over the end of the hose, and the hose be then expanded or driven outwardly against the screw-thread by a suitable plug. The ring and hose having been thus connected, as seen at B, the plug is removed, and the tail-piece c is then screwed into the ring by means of its screw e working into the screw i of the ring, until the inner end of the ring abuts against the coupling-flange d, as seen at A. The tapering part of the screw i in this operation expands the part of the leather adjacent to the recess l, outwardly against the conical or recessing surface l, while the straight part g compresses the leather firmly into the screw-thread k; this connection making the joint perfectly tight, and securing the coupling against all possibility of being blown off.

In the old method of applying the tail-piece within the tube, the friction between the leather and screw is often so great that the hose turns round in the ring, and the screw does not turn in the leather, both turning together. But, by making the screw k a "left-handed" screw, it will be seen that any tendency of the hose to turn in the ring while screwing in the tail-piece, screws the ring more tightly or further upon the hose instead of away therefrom, and of course makes the connection still more secure.

I claim, in combination with the tail-piece of the coupling, having a screw-thread upon its outer surface, the encompassing-ring having two screw-threads, one for screwing upon the outer surface of the hose, and the other for connecting the ring to the tail-piece, substantially as set forth.

I also claim the recess l and tapering screw or surface f, in combination with the encompassing-ring and tail-piece, substantially as set forth.

I also claim the screw-threads at the respective ends of the encompassing-ring h, made to run in opposite directions, substantially as described.

ANDREW J. MORSE.

Witnesses:
FRANCIS GOULD,
L. H. LATIMER.